United States Patent
Ogawa

(10) Patent No.: US 7,618,726 B2
(45) Date of Patent: Nov. 17, 2009

(54) FUEL CELL SYSTEM AND PROTECTION METHOD THEREOF

(75) Inventor: Soichiro Ogawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1018 days.

(21) Appl. No.: 10/505,226

(22) PCT Filed: Feb. 27, 2003

(86) PCT No.: PCT/JP03/02198

§ 371 (c)(1),
(2), (4) Date: Aug. 20, 2004

(87) PCT Pub. No.: WO03/081704

PCT Pub. Date: Oct. 2, 2003

(65) Prior Publication Data

US 2007/0003804 A1    Jan. 4, 2007

(30) Foreign Application Priority Data

Mar. 27, 2002 (JP) ............................. 2002-088075

(51) Int. Cl.
*H01M 8/00*   (2006.01)
*H01M 8/04*   (2006.01)
*H01M 8/12*   (2006.01)

(52) U.S. Cl. ........................... 429/13; 429/12; 429/22; 429/24

(58) Field of Classification Search ................ None
See application file for complete search history.

(56) References Cited

U.S. PATENT DOCUMENTS

| 4,513,808 | A  | * | 4/1985  | Ito et al. ....................... 165/43 |
| 6,955,861 | B2 | * | 10/2005 | Yoshizawa et al. ............ 429/26 |
| 2001/0030624 | A1 | * | 10/2001 | Schwoegler ........... 342/357.13 |
| 2003/0082426 | A1 | * | 5/2003  | Bullock et al. ................ 429/34 |
| 2003/0162063 | A1 | * | 8/2003  | Yoshizawa et al. ............ 429/24 |

FOREIGN PATENT DOCUMENTS

| JP | 07-169476 | 12/1993 |
| JP | 08-106914 | 4/1996 |
| JP | 08-273689 | 10/1996 |
| JP | 2006-500733 | 1/2006 |
| WO | WO 96/41393 | 12/1996 |
| WO | WO02/01662 | * 1/2002 |
| WO | WO 02/01662 A1 | 1/2002 |
| WO | WO 03/073547 | 9/2003 |

* cited by examiner

*Primary Examiner*—Dah-Wei D Yuan
*Assistant Examiner*—Steven Scully
(74) *Attorney, Agent, or Firm*—McDermott Will & Emery LLP

(57) ABSTRACT

A system has two modes which protect it from freezing of water while a fuel cell stack has stopped. An effective protection mode from the viewpoint of energy consumption is selected based on the estimated restart time and outside air temperature shift, and used to protect the system. The protection modes are: a first protection mode which prevents freezing by heating the water supplied to the fuel cell, and a second protection mode which avoids freezing of water in the fuel cell by discharging the water in the fuel cell to outside the fuel cell, and freezing the water outside the fuel cell.

16 Claims, 11 Drawing Sheets

FUEL CELL SYSTEM AND PROTECTION METHOD THEREOF

FIELD OF THE INVENTION

This invention relates to a fuel cell system, and in particular a method of protecting the system below freezing point.

BACKGROUND OF THE INVENTION

Fuel cells are devices which extract electrical energy due to an electrochemical reaction occurring in an electrolyte membrane, and some fuel cells need the electrolyte membrane to be humidified in order to generate power. In general, pure water is used to humidify the electrolyte membrane so that impurities do not adhere to the electrolyte membrane and cause the performance of the fuel cell to deteriorate. Pure water is also used to cool the fuel cell. However, when pure water is used for humidifying or cooling the electrolyte membrane, if the system is left below freezing point when the fuel cell has stopped, the water freezes inside the system, and there is a possibility that the internal structure of the system may be damaged due to the volume expansion caused by solidification. There is also a possibility that due to the frozen water, the flowpaths which supply gas, air or water to the fuel cell may also become clogged so that the system cannot be restarted.

To resolve these problems, JP7-169476A published by the Japanese Patent Office in 1995 discloses a method for warming the fuel cell with a heater so that its temperature does not fall below 0° C. when the fuel cell has stopped. Also, JP8-273689A published by the Japanese Patent Office in 1996 discloses a method of avoiding freezing of the water in the fuel cell by discharging water outside the fuel cell when the fuel cell has stopped, thus causing the water to freeze outside the fuel cell.

SUMMARY OF THE INVENTION

However, in the former methods, the energy amount required to protect the fuel cell continually increases as the stopping time of the fuel cell becomes longer, and they cannot be applied without modification to vehicle fuel cells which have a limit to the energy amount which can be used. Further, in the latter method, a relatively large amount of energy is required to protect the fuel cell even when the stopping time of the fuel cell is short, the frozen water must be thawed when the fuel cell is restarted, and it cannot be restarted quickly.

It is therefore an object of this invention to protect the system from freezing of water when the fuel cell has stopped, and to provide a fuel cell system which has high restarting response.

In order to achieve above object, the present invention provides a fuel cell system, comprising a fuel cell which generates power by supplying an oxidizing agent and a hydrogen-containing gas to an electrolyte membrane, a water supply device which supplies water to the fuel cell, and a controller. The controller functions to estimate a restart time when the fuel cell is restarted, estimate a shift of an outside air temperature, compute a first energy amount required when the system is protected by a first protection mode which prevents freezing of water in the system by heating water supplied to the fuel cell when the fuel cell has stopped, and a second energy amount required when the system is protected by a second protection mode which prevents freezing of water in the system by discharging water from the fuel cell when the fuel cell has stopped, respectively based on the estimated restart time and outside air temperature shift, select the first protection mode when the first energy amount is less than the second energy amount, and select the second protection mode when the first energy amount is larger than the second energy amount as a protection mode used when the fuel cell has stopped, and protect the system with the selected protection mode.

According to an aspect of the invention, the invention provides a method of protecting a fuel cell system having a fuel cell which generates power by supplying an oxidizing agent and a hydrogen-containing gas to an electrolyte membrane, and a water supply device which supplies water to the fuel cell. The method comprises estimating a restart time when the fuel cell is restarted, estimating a shift of an outside air temperature, computing a first energy amount required when the system is protected by a first protection mode which prevents freezing of water in the system by heating water supplied to the fuel cell when the fuel cell has stopped, and a second energy amount required when the system is protected by a second protection mode which prevents freezing of water in the system by discharging water from the fuel cell when the fuel cell has stopped, respectively based on the estimated restart time and outside air temperature shift, selecting the first protection mode when the first energy amount is less than the second energy amount, and selecting the second protection mode when the first energy amount is larger than the second energy amount as a protection mode used when the fuel cell has stopped, and protecting the system with the selected protection mode.

The details as well as other features and advantages of this invention are set forth in the remainder of the specification and are shown in the accompanying drawings.

DESCRIPTION OF THE PREFERRED EMBODIMENTS

Figure 1:
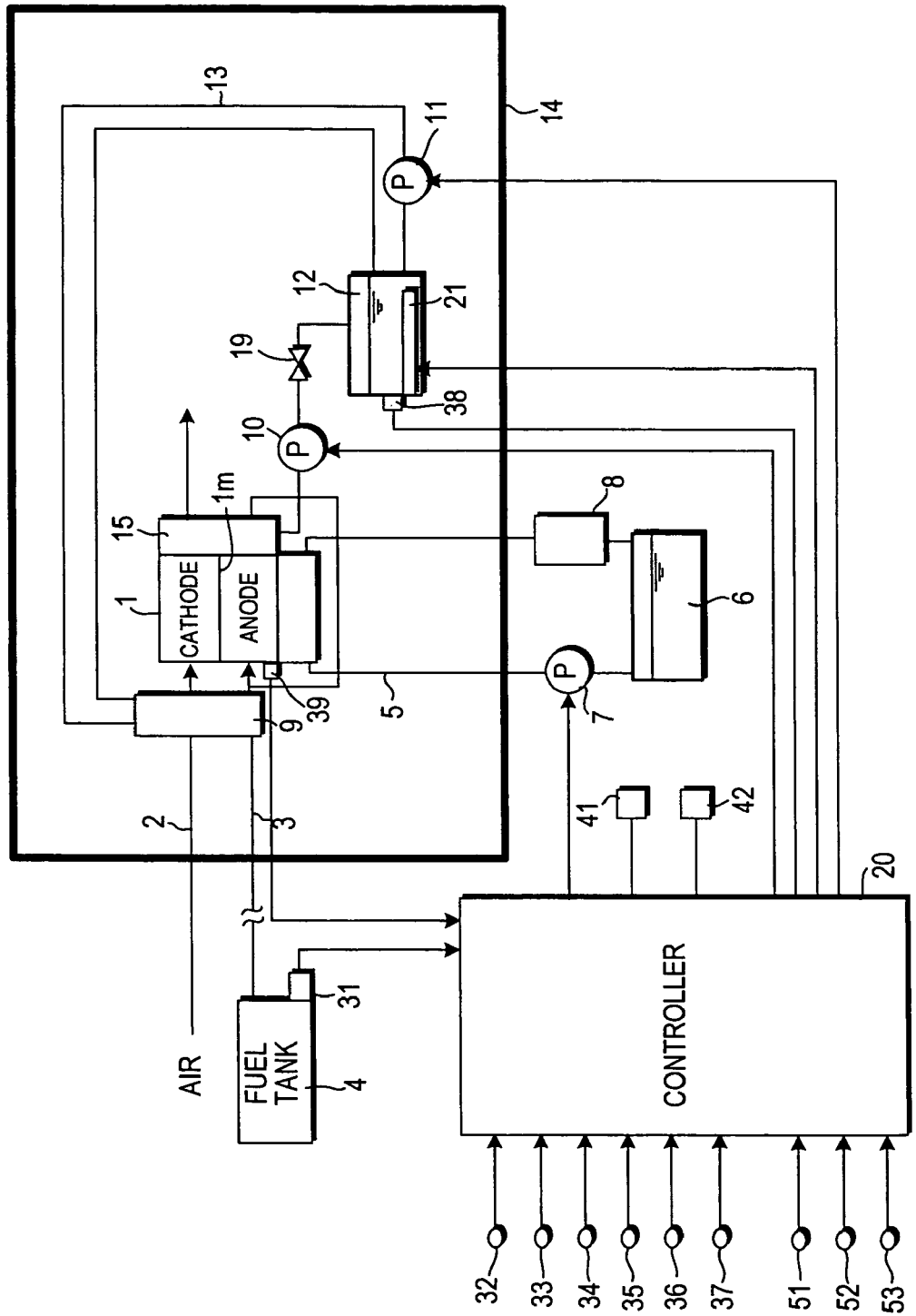
FIG. 1 is a schematic diagram of a fuel cell system according to this invention.

FIG. 1 shows a schematic diagram of a fuel cell system according to this invention. This fuel cell system is used in a vehicle. In a fuel cell stack 1, a cathode gas passage and anode gas passage are installed on either side of an electrolyte membrane 1m. Air is supplied as an oxidizing agent to the cathode gas passage via an air supply passage 2, and hydrogen-containing gas is supplied to the anode gas passage via a fuel supply passage 3. As a result, the following electrochemical reactions take place on the surface of the electrolyte membrane 1m.

Anode reaction: $H_2 \rightarrow 2H^+ + 2e^-$

Cathode reaction: $2H^+ + 2e^- + (\frac{1}{2})O_2 \rightarrow H_2O$

Thus, electrical energy can be extracted from the fuel cell stack 1.

Hydrogen stored in a fuel tank 4, or reformate gas containing hydrogen obtained by reforming hydrocarbon fuel such as natural gas, methanol, gasoline stored in the fuel tank 4 reformed by a reformer, is supplied to the fuel supply passage 3.

A coolant passage 5 passes through the fuel cell stack 1. A coolant stored in a coolant tank 6 (antifreeze, or mixture of antifreeze with water) is supplied to the fuel cell stack 1 by a pump 7, and circulated through the fuel cell stack 1 to cool it. The heat recovered from the fuel cell stack 1 is discharged to the atmosphere from a heat exchanger 8.

To fully extract the performance of the electrolyte membrane 1m and enhance the power-generating efficiency of the fuel cell stack 1, the humidification state of the electrolyte membrane 1m must be maintained at an optimum level. For this purpose, according to this embodiment, a humidifier 9 is provided upstream of the fuel cell stack 1 to humidify the air and hydrogen-containing gas which are supplied to the electrolyte membrane 1m. A controller 20 drives a pump 11 according to the running state of the fuel cell stack 1, and supplies water to the humidifier 9 from a water storage tank 12 via a water supply passage 13. Water which was not consumed in the humidifier 9 is recycled to the water storage tank 12.

The fuel cell stack 1 is an external humidification type which humidifies the electrolyte membrane 1m using the humidifier 9, but it may also be an internal humidification type wherein the water supply passage 13 is brought in contact with the air supply passage 2 (or cathode passage), fuel supply passage 3 (or anode passage) on either side of a porous material, wherein air and hydrogen-containing gas are humidified by allowing water to penetrate into the air supply passage 2 and fuel supply passage 3 from the water supply passage 13.

The water consumed in the humidifier 9 is discharged as part of the exhaust from the fuel cell stack 1, so a gas-liquid separator 15 which separates the water contained in the exhaust from the fuel cell stack 1 is connected downstream of the fuel cell stack 1. The water separated by the gas-liquid separator 15 is returned to the water storage tank 12 via a pump 10 and valve 19. A heater 21 is installed to heat the water inside the water storage tank 12. A burner may also be provided instead of the heater 21. The water storage tank 12 has a construction such that it can withstand volume expansion when the second protection mode described later is selected and internal water freezes.

Further, the components of the system excepting the coolant tank 6, pump 7 and heat exchanger 8 (main component elements such as the fuel cell stack 1, humidifier 9 and water storage tank 12) are housed in a protection case 14 constructed of an adiabatic material to suppress the temperature drop of the components when the fuel cell stack 1 stops.

Pure water is used to humidify the electrolyte membrane 1m. This is because if water containing impurities is supplied to the fuel cell stack 1, the impurities adhere to the electrolyte membrane 1m, and reduce the performance of the fuel cell stack 1. However, when pure water is used for humidification, the water in the system may freeze when the system is left below freezing point when the fuel cell has stopped, the internal construction of the system may be damaged by the volume expansion during freezing. The frozen water may block the air or water passages and prevent the restart of the system.

Hence, in the fuel cell system according to this invention, two modes are provided for protecting the system from water freezing when the fuel cell system is left below freezing point, and the system is protected from water freezing by one of these modes when the fuel cell stack 1 stops. Specifically, the two modes are:

Mode (1): The pump 11 is driven to recycle the water in the water supply passage 13, and the water in the water storage tank 12 is heated by the heater 21 installed in the water storage tank 12 to prevent freezing of the water in the system.

Mode (2): The pumps 10, 11 are driven to discharge water in the fuel cell stack 1 into the water storage tank 12, and freezing of water in the fuel cell stack 1 is prevented by removing practically all the water in the fuel cell stack 1. When the system is restarted, the heater 21 is driven to thaw the water frozen in the water storage tank 12.

When the fuel cell stack 1 is stopped, the controller 20 selects one of the protection modes to protect the system from freezing of water.

Signals are input to the controller 20 from a remaining fuel amount sensor 31 which detects the fuel amount remaining in the fuel tank 4, a GPS receiver 32 which receives information about the vehicle's position from satellites, an outside air temperature sensor 33 which detects the temperature (outside air temperature) outside the vehicle, an illumination sensor 34 which detects the illumination surrounding the vehicle, an oxygen sensor 35 which detects the oxygen concentration surrounding the vehicle, a remaining battery amount sensor 36 which detects a remaining battery amount of a battery, not shown, an input device 37 to allow the driver to input information such as the vehicle restart time, a water temperature sensor 38 which detects the temperature of the water in the water storage tank 12 and a water amount sensor 39 which detects the water amount in the fuel cell stack 1 (specifically, the water amount in the water buffer in the fuel cell stack 1), together with time and data information from a clock 51, climatic information from a radio 52, and a system start signal and stop signal from a system start/stop switch 53.

The controller 20, when the fuel cell stack 1 has stopped, computes the energy amount required to protect the system in each of the protection modes, and protects the system by selecting the protection mode requiring the lesser energy amount. However, even when the fuel cell system is protected in this way, if the driver performs a start operation by switching the switch 53 and shows an intention to start the fuel cell stack 1, the controller 20 immediately stops the protection processing, and starts the fuel cell stack 1.

The fuel cell system further comprises an indicator 41 which displays a warning message or lights a warning lamp and encourages the driver to refuel when the detected remaining fuel amount or battery amount has fallen to a low level, and an alarm 42 which issues a warning sound or warning message and encourages the driver to refuel when the detected remaining fuel amount or battery amount has fallen to a low level.

Hereafter, the processing performed to protect the system when the fuel cell stack 1 has stopped, will be described.

Figure 2:
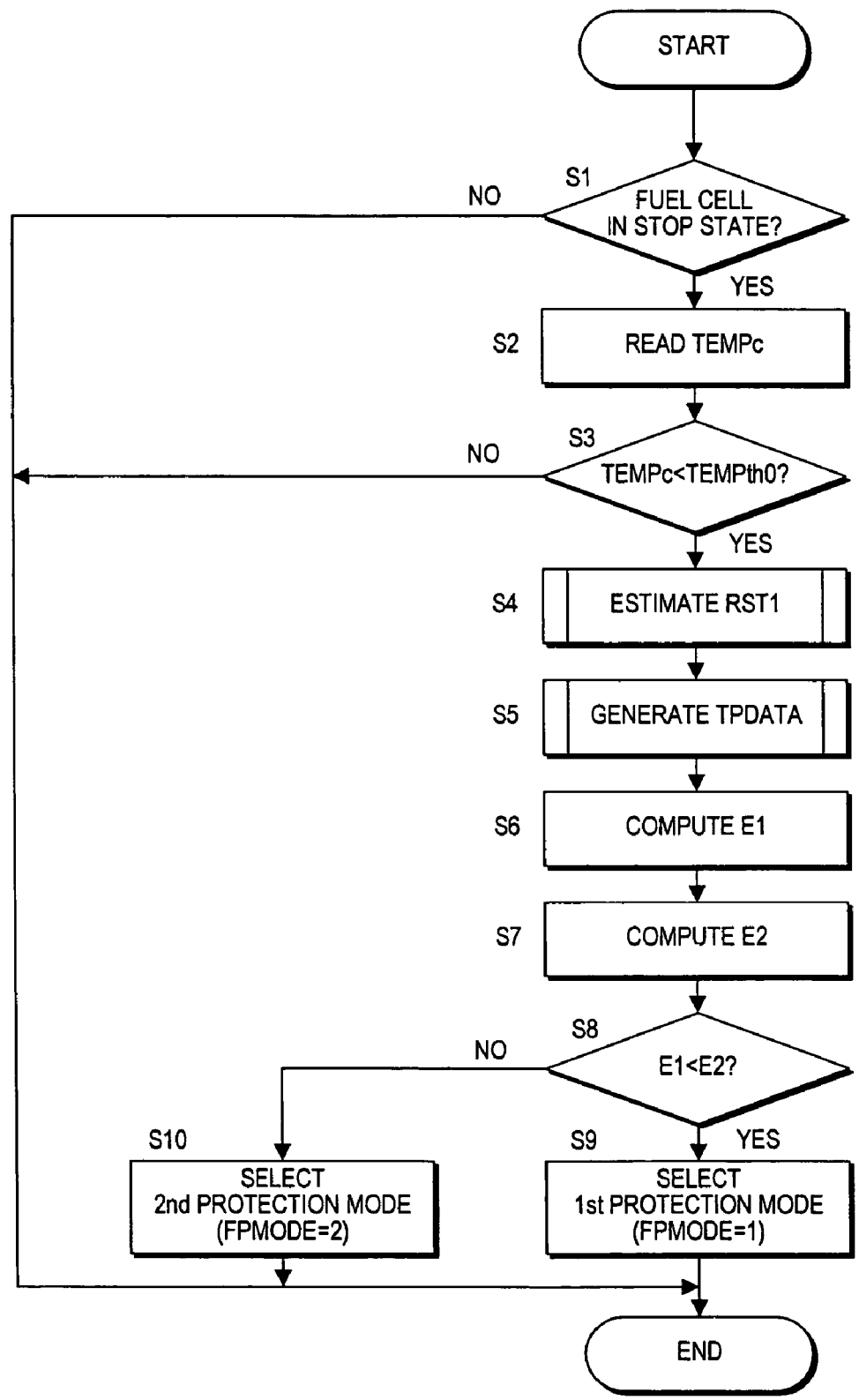
FIG. 2 is a flowchart showing a protection mode selection processing.

FIG. 2 shows a protection mode selection processing performed by the controller 20, which is executed repeatedly at a predetermined interval (e.g., every 10 milliseconds).

First, in a step S1, it is determined whether the fuel cell stack 1 has stopped based on the start signal and stop signal input to the controller 20 from the system start/stop switch 53. For example, if the start signal is not input after the stop signal was input, it is determined that the fuel cell stack 1 is in the stop state. Here, the stop state does not mean a transient stop or idle stop, but that the driver has switched off the switch 53 and left the vehicle, so that the vehicle has stopped running for a certain time (e.g., one week). When the fuel cell stack 1 is running, there is no concern the water in the system will freeze due to the heat generation by the fuel cell stack 1, so the routine is terminated.

When it is determined that the fuel cell stack 1 has stopped, the routine proceeds to a step S2, and a fuel cell temperature TEMPc is read. The fuel cell temperature TEMPc may be the temperature of the fuel cell stack 1 itself, but as the problem here is freezing of water in the system, the temperature of the water used for humidification, i.e., the temperature of the water in the water storage tank 12, is used (hereafter, idem).

In a step S3, it is determined whether or not the fuel cell temperature TEMPc has fallen below a predetermined temperature TEMPth0 (temperature in the vicinity of 0° C., e.g., 5° C.). When it has not fallen below the predetermined temperature, there is no concern that the water in the system will freeze, so there is no need for protection and this routine is terminated. When the fuel cell temperature TEMPc has fallen below the predetermined temperature TEMPth0, the water in the system may freeze, so the routine performs the system protection processing of a step S4 and subsequent steps.

In the step S4, a restart time RST1 of the fuel cell stack 1 is estimated. The restart time of the fuel cell stack 1 is estimated according to the flowchart shown in FIG. 6, which will be described in detail later.

In a step S5, the future variation of outside air temperature is estimated, and outside air temperature shift data TPDATA is generated. The outside air temperature shift data is generated until for example the restart estimation time RST1. The outside air temperature shift data TPDATA is information which shows the relation between the time after the fuel cell stack 1 has stopped and the outside air temperature, an example thereof being shown in FIG. 3. The outside air temperature shift data TPDATA is generated according to the flowchart shown in FIG. 7, which will be described in detail later.

In steps S6, S7, an energy amount E1 required when the system is protected in the first protection mode (protection by heating and maintaining temperature of water) until the restart estimation time RST1, and an energy amount E2 required when the system is protected in the second protection mode (protection by discharging water from the fuel cell stack 1 to the water storage tank 12) until the restart estimation time RST1, are respectively computed based on the outside air temperature shift data TPDATA generated in the step S5 and the restart estimation time RST1 of the fuel cell stack 1 estimated in the step S4.

Specifically, the energy amounts E1, E2, which are required to protect the system if the outside air temperature is constant at the present outside air temperature, are first calculated. Regarding the energy amount E1 required when the first protection mode is selected, it is calculated as the energy amount required to compensate the heat released from the fuel cell stack 1 to the outside by heating with the heater 21 and maintain the temperature the fuel cell stack 1 above 0° C. The energy amount E2 required when the second protection mode is selected is calculated as the sum of the energy amount required to heat and thaw water frozen in the water storage tank 12 with the heater 21, and the energy amount required to compensate the heat escaping from the surface of the ice during thawing by heating with the heater 21. Herein, for simplification, the energy amount required to drive the pumps 10, 11 is not taken into account, but to calculate the energy amounts E1, E2 more precisely, these energy amounts may be taken into account.

Figure 4:
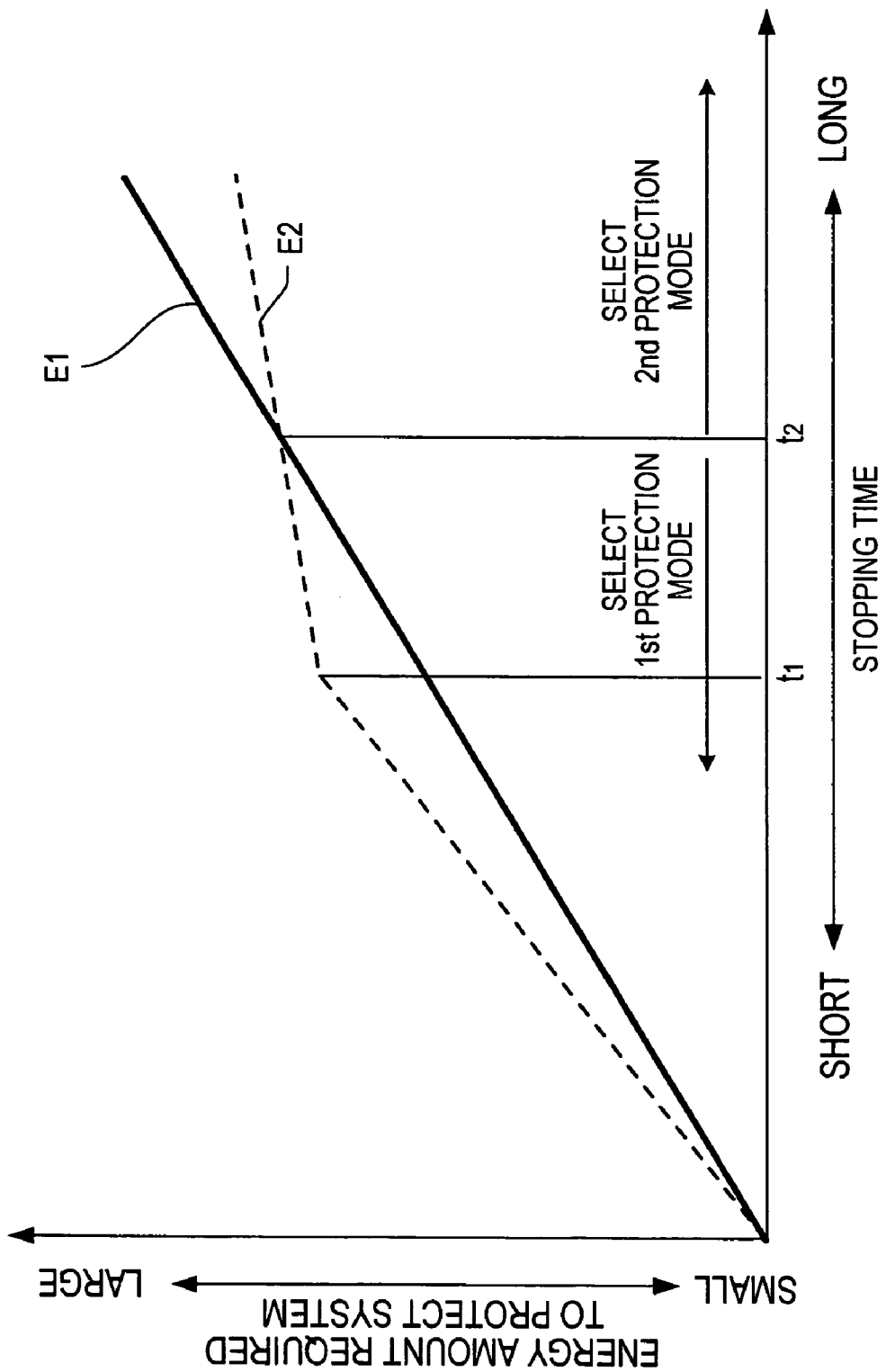
FIG. 4 is a diagram showing the relation between stopping time and energy amounts required for protection; the solid line is an energy amount required when a first protection mode is selected, and the broken line is an energy amount required when a second protection mode is selected.

FIG. 4 shows an example of the energy amounts E1, E2 required for protection calculated in this way. Whichever of the protection modes is selected, the energy amount required to protect the system increases the longer the stopping time is. When the stopping time is short, the energy amount increases more rapidly in the second protection mode than in the first protection mode, so the energy amount E1 is less than the energy amount E2. However, when the second protection mode is selected, the required energy amount increase rate levels off beyond a certain stopping time (t1 in the figure), and the relative magnitudes of the energy amounts E1, E2 required when the first protection mode and second protection mode are selected, are inverted at a certain stopping time (t2 in the figure).

This is because, in the first protection mode, whereas the stopping time and required protection energy amount have a linear relationship, in the second protection mode, the required protection energy amount is determined according to the amount of ice in the water storage tank 12 which increases according to the stopping time, and after all the water in the water storage tank 12 has frozen, the ice amount is constant regardless of the stopping time. However, when all the water in the water storage tank 12 has frozen, the water temperature falls below 0° C. and the energy amount required for thawing increases, so the energy amount required for protection gradually increases according to the stopping time even after all the water has frozen.

Figure 5:
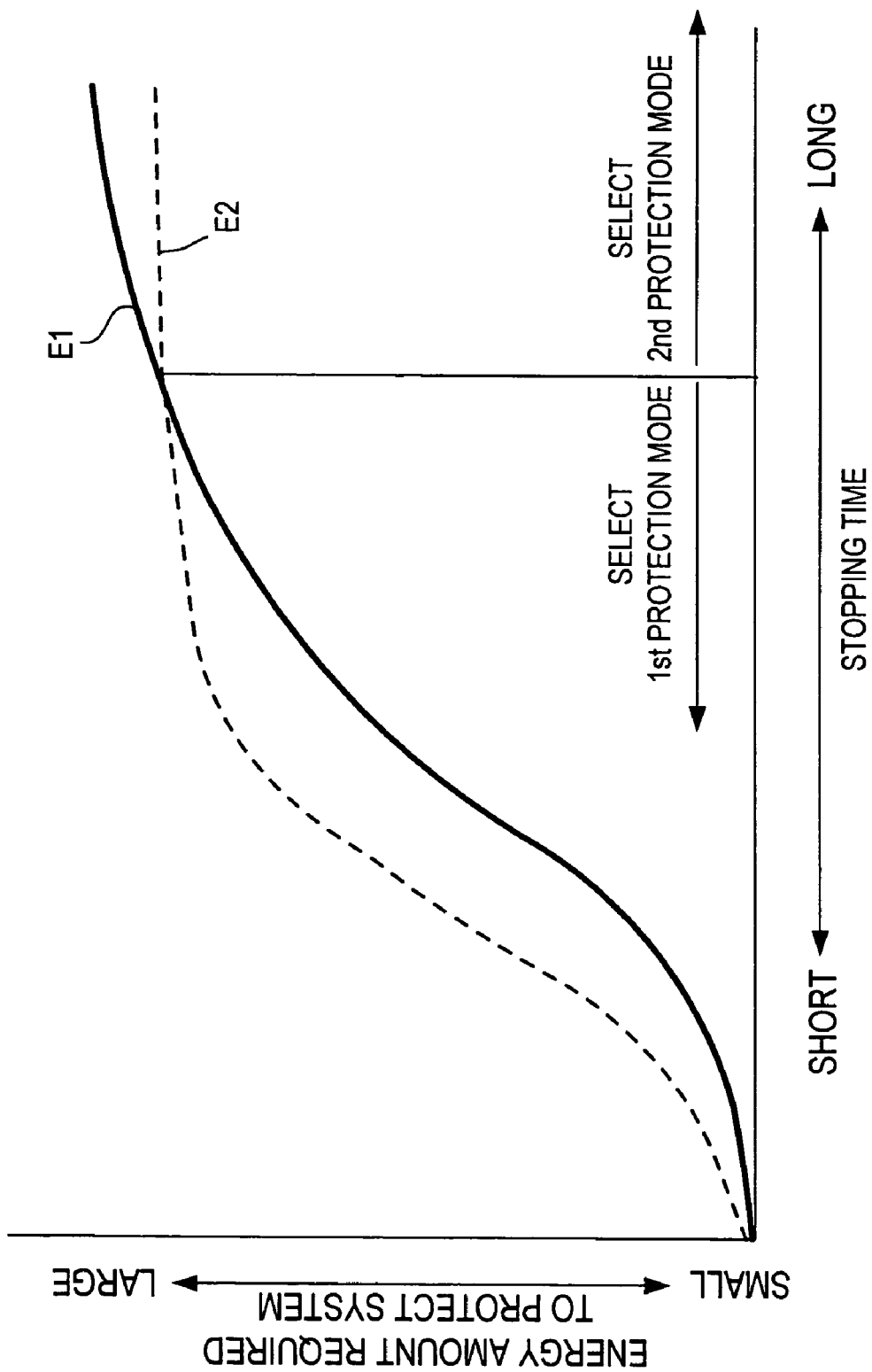
FIG. 5 is a diagram showing the relation between stopping time and the energy amounts required for protection, obtained by correcting FIG. 4 based on the outside air temperature shift data.

Also, the energy amount required for protection is affected by the outside air temperature. If the outside air temperature is low, the fall of system temperature is sharp so the energy amount required for protection increases (required energy amount slope increases). In this connection, in the steps S6, S7 the energy amounts E1, E2 calculated in this way are corrected based on the outside air temperature shift data TPDATA generated in the step S4, and taken as the required protection energy amounts E1, E2 when the two modes are selected. FIG. 5 shows an example of the data after correction.

In a step S8, the energy amount E1 required when the first protection mode is selected and the energy amount E2 when the second protection mode is selected, are compared. When the energy amount E1 is less than the energy amount E2, the routine proceeds to a step S9, the first protection mode is selected, and a flag FPMODE is set to "1" showing that the first protection mode is selected. Conversely, when the energy amount E1 is higher than the energy amount E2, the routine proceeds to a step S10, the second protection mode is selected, and the flag FPMODE is set to "2" showing that the second protection mode is selected.

Next, the restart time estimation processing performed by the controller 20 will be described referring to FIG. 6. This estimation processing is performed assuming that the driver uses the vehicle once every week on a specified day (e.g., Sunday). This estimation processing corresponds to the processing in the step S4 of FIG. 2.

First, in a step S21, a restart estimation time initial value RST0 is read. The initial value RST0 is set to a suitable time (e.g., 12:00) when the vehicle is shipped from the factory or is delivered to the user, and is updated to a new value each time the fuel cell stack 1 restarts by a processing (learning processing) of a step S25 and subsequent steps.

In a step S22, it is determined whether an external input time RST2 (restart time estimated by driver) input from the input device 37 exists. When the external input time RST2 does not exist, the routine proceeds to a step S23, and the restart estimation time RST1 is set to the time RST0 after one week. Conversely, when the external input time RST2 exists, the routine proceeds to a step S24, and the restart estimation time RST1 is set to the time RST2 after one week.

The restart estimation time RST1 is estimated by the above processing, but to enhance the estimation precision, in this flowchart, the restart estimation time initial value RST0 used for the subsequent estimation is corrected based on the difference between the actual restart time and the estimated restart time. Specifically, when the restart estimation time RST1 is set in the step S23 and the fuel cell stack 1 restarts, the routine proceeds from the step S25 to a step S26, and the actual start time is stored as RST3. In a step S27, it is determined whether the difference between the actual restart time RST3 and restart estimation time RST1 is less than a predetermined value $\Delta$RSTth. When it is less, the restart time initial value RST0 is not corrected, and when it is not less, the routine proceeds to a step S28 and the restart estimation time initial value RST0 is corrected by:

$$RST0=RST1+(RST3-RST1)\times G2$$

where, G2=gain.

Likewise, when the restart estimation time RST1 is set in the step S24, and the fuel cell stack 1 restarts, the routine proceeds from a step S29 to a step S30, and the restart estimation time initial value RST0 is corrected to RST2. When a restart was performed, the routine proceeds from the step S29 to a step S31, and the actual restart time is stored as RST3.

It is then determined in a step S32 whether the difference between RST3 and the restart estimation time RST1 (=RST2) is less than the predetermined value $\Delta$RSTth. When the difference is less than the predetermined value $\Delta$RSTth, the routine proceeds to a step S33 and the restart estimation time initial value RST0 is corrected to RST2, otherwise the routine proceeds to step S34 and the restart estimation time initial value RST0 is corrected by:

$$RST0=RST2+(RST3-RST2)\times G1$$

where, G1=gain.

Figure 7:
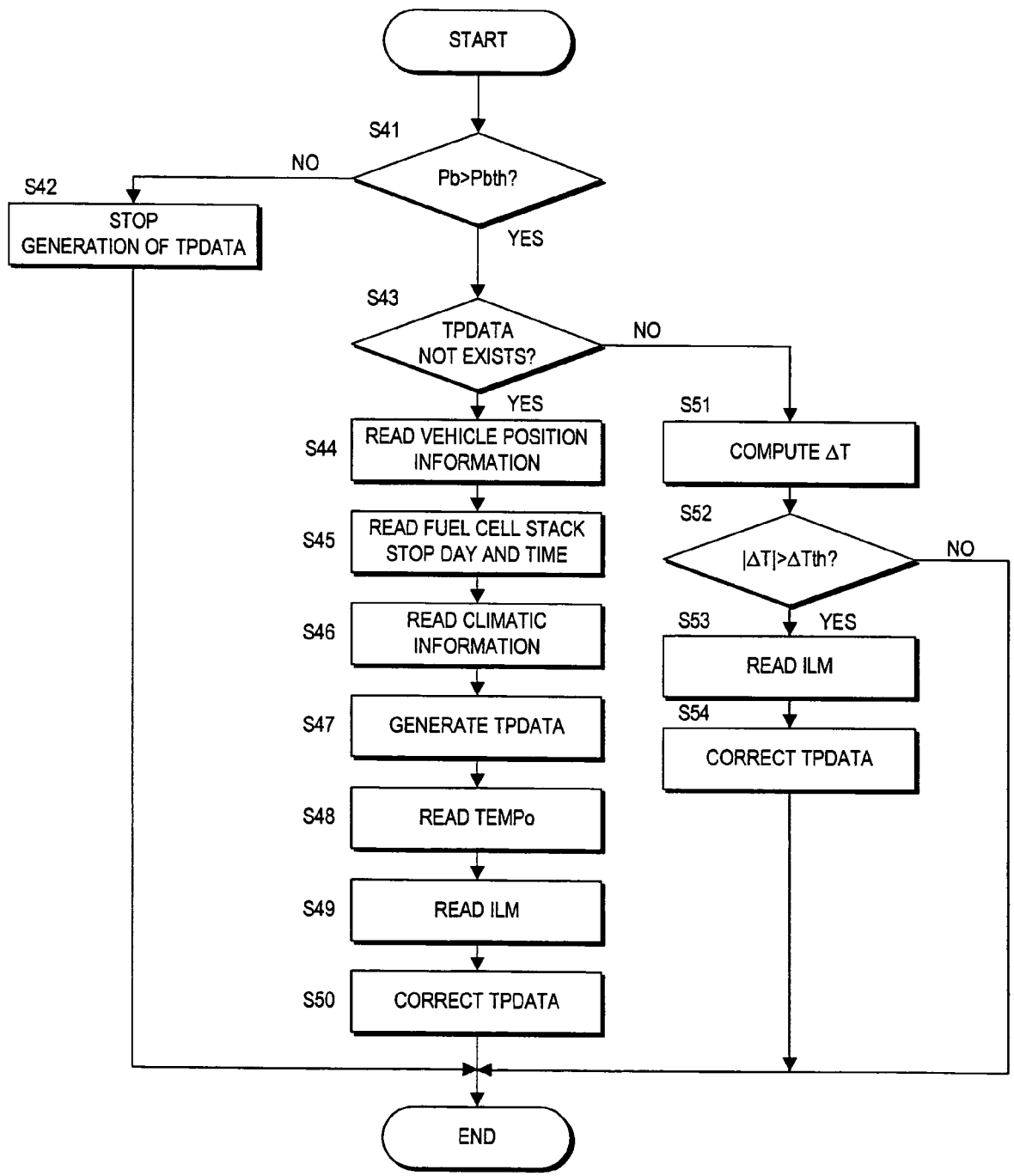
FIG. 7 is a flowchart showing an outside air temperature shift data generation processing.

Next, the procedure for generating the outside air temperature shift performed by the controller 20 will be described referring to FIG. 7. This processing corresponds to the processing in the step S5 of FIG. 2.

First, in a step S41, it is determined whether a backup power amount Pb is larger than a predetermined value Pbth. When the backup power amount Pb is less than the predetermined value Pbth, the routine proceeds to a step S42 and generation of the outside air temperature shift is stopped to avoid the whole backup power being used up.

When the backup power amount Pb is larger than the predetermined value Pbth, the routine proceeds to a step S43, and it is determined whether the outside air temperature shift data TPDATA already exists. If the outside air temperature shift data TPDATA does not exist, the routine proceeds to a step S44 and subsequent steps to generate the outside air temperature shift data TPDATA, whereas if it does exist, the routine proceeds to a step S51 and subsequent steps to correct the outside air temperature shift data TPDATA to further enhance the precision.

In the step S44, vehicle position information received from the GPS receiver 32, is read. In a step S45, the day and time when the fuel cell stack 1 stopped, which is stored in the memory of the controller 20, are read. Further, in a step S46, climatic information corresponding to the vehicle position and the day and time (future weather, temperature variation) acquired from the radio 52 are read.

Figure 3:
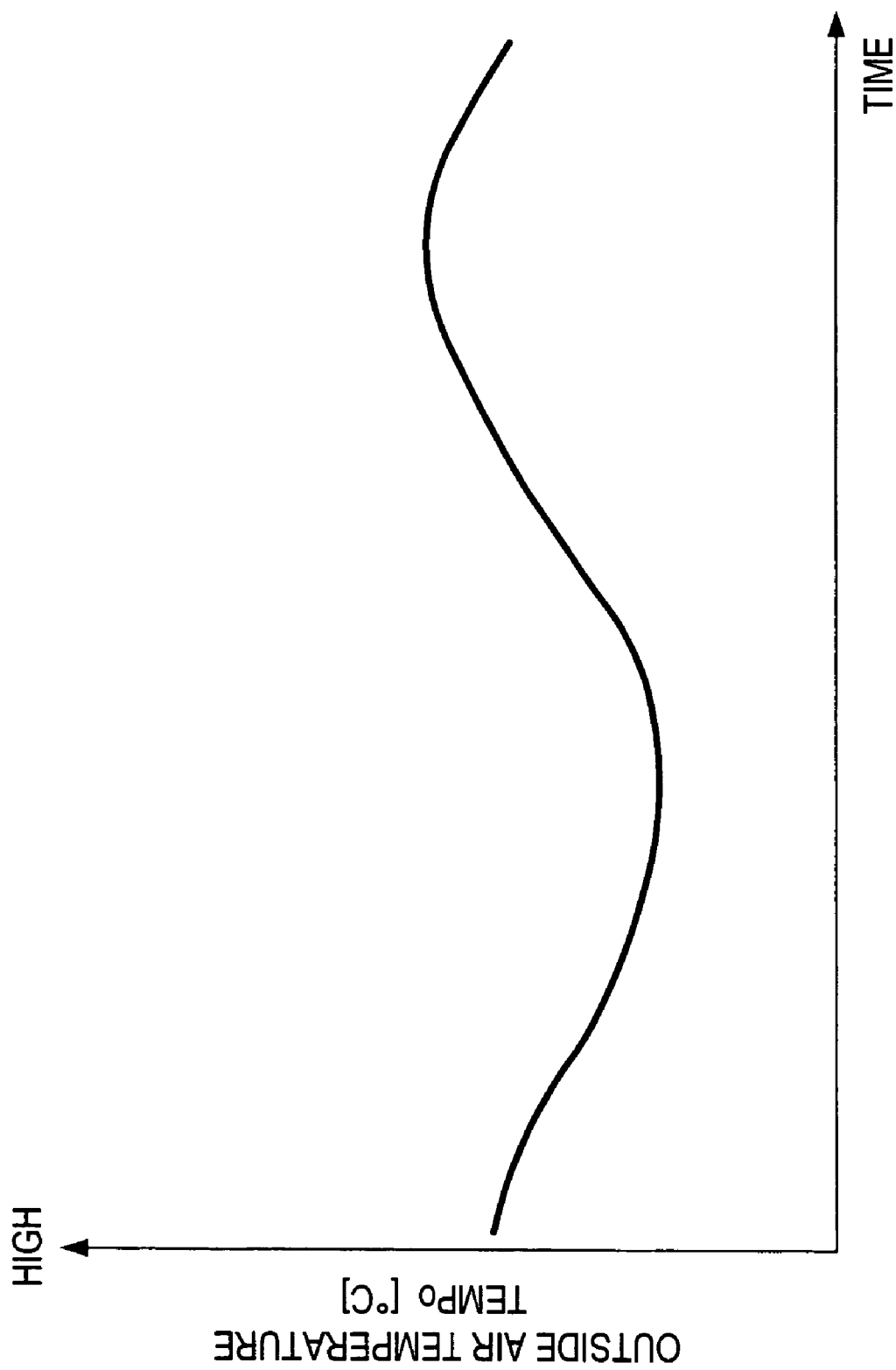
FIG. 3 is an example of generated outside air temperature shift data.

In a step S47, future outside air temperature shifts (e.g., outside air temperature shifts until the restart estimation time RST1 after one week) are estimated based on the climatic information, and the outside air temperature shift data TPDATA shown in FIG. 3 is generated. The temperature shift may be estimated from the vehicle position, day and time (season) without acquiring climatic information, or the temperature shift may be estimated from the vehicle position, day and time (season) when climatic information cannot be acquired for some reason.

In a step S48, a present outside air temperature TEMPo detected by the outside air temperature sensor 33 is read. In a step S49, an illumination ILM surrounding the vehicle detected by the illumination sensor 34 is read. In a step S50, the outside air temperature shift data TPDATA generated in the step S47 is corrected based on the present outside air temperature TEMPo and the illumination ILM in order to further enhance the precision of the outside air temperature shift data TPDATA. For example, if the detected outside air temperature TEMPo is higher than the outside air temperature based on the climatic information, or the detected illumination ILM is higher than a predetermined value ILMth, the outside air temperature shift data TPDATA is shifted to higher temperature. The predetermined value ILMth may for example be stored in the memory according to the vehicle position (latitude, altitude) and day (season), and set to an illumination value at which direct sunlight falls on the vehicle.

When it is determined in the step S43 that the outside air temperature shift data TPDATA already exists, the routine proceeds to a step S51, and a difference $\Delta$T between a value obtained by looking up the outside air temperature shift data TPDATA (outside air temperature estimation value) and the present outside air temperature TEMPo detected by the outside air temperature sensor 33, is calculated. When it is determined in a step S52 that the absolute value of $\Delta$T is larger than a predetermined value $\Delta$Tth, the outside air temperature shift data TPDATA does not reliably represent the actual outside air temperature shift, so the routine proceeds to a step S53 to correct the outside air temperature shift data TPDATA. If not, the outside air temperature shift data TPDATA agrees well with the actual outside air temperature shift, so the routine is terminated without correcting the outside air temperature shift data TPDATA.

In the step S53, the illumination ILM is detected by the illumination sensor 34. In a step S54, the outside air temperature shift data TPDATA is corrected based on $\Delta$T and the illumination ILM. Specifically, the outside air temperature shift data TPDATA is for example shifted by $\Delta$T, or when the detected illumination ILM is higher than the predetermined value ILMth, the outside air temperature shift data TPDATA is shifted to the high side.

Figure 8:
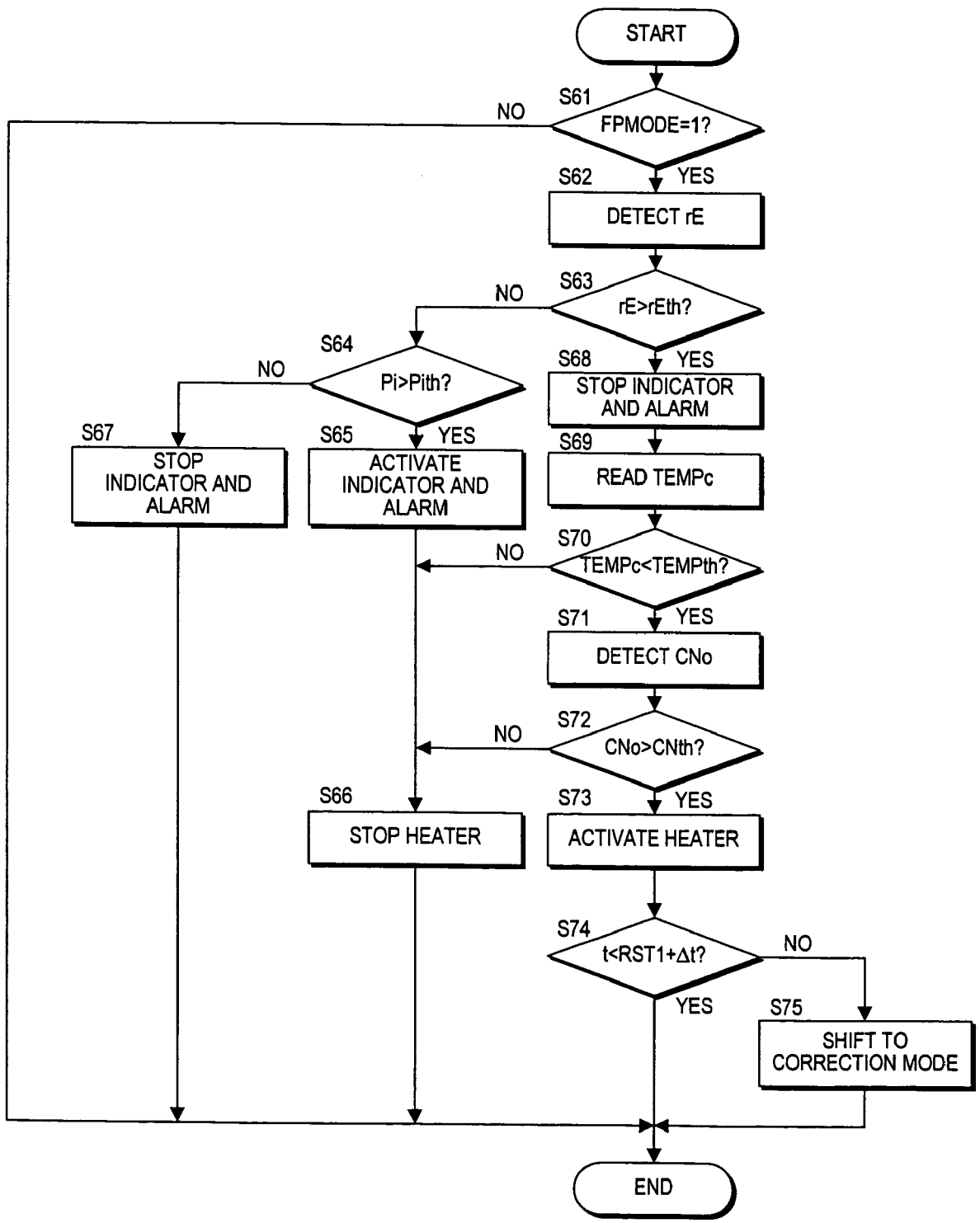
FIG. 8 is a flowchart showing a protection processing when the first protection mode is selected.

Next, the protection processing performed by the controller 20 when the first protection mode is selected in the step S9 of FIG. 2 will be described referring to FIG. 8.

First, in a step S61, it is determined whether the first protection mode is selected based on the value of the flag FPMODE. When it is determined that the flag FPMODE is "1" and the first protection mode has been selected, the routine proceeds to a step S62, otherwise this routine is terminated.

In the step S62, the remaining energy amount rE (remaining fuel amount, remaining battery amount) is detected. In a step S63, it is determined whether the detected remaining energy amount rE is larger than a predetermined value rEth. The predetermined value rEth is set for example to the minimum energy amount required to restart the fuel cell stack 1 and then run the vehicle for a certain time after the fuel cell stack 1 is restarted. When the remaining energy amount rE is less than the predetermined value rEth, the routine proceeds to a step S64, otherwise the routine proceeds to a step S68.

In the step S64, it is determined whether the power amount Pi for the indicator 41 and alarm 42 is larger than a predetermined value Pith. When it is larger than the predetermined value Pith, the routine proceeds to a step S65, the indicator 41 and alarm 42 are activated, the routine proceeds to a step S66 and the heater 21 is stopped. On the other hand, when the power amount Pi for the indicator 41 and alarm 42 is less than the predetermined value Pith, the routine proceeds to a step S67, and the indicator 41 and alarm 42 are stopped.

If it is determined in the step S63 that the remaining energy amount rE is larger than the predetermined value rEth and the routine proceeds to the step S68, the indicator 41 and alarm 42 are stopped, and the fuel cell temperature TEMPc is read.

In a step S70, it is determined whether the fuel cell temperature TEMPc is lower than a predetermined temperature TEMPth (e.g., 2° C.). If it is lower than TEMPth, the routine proceeds to a step S71, otherwise the routine proceeds to the step S66 and the heater 21 is stopped.

In the step S71, an oxygen concentration CNo is detected. In a step S72, it is determined whether the oxygen concentration CNo is greater than a predetermined concentration CNth. The predetermined concentration CNth may for example be set to a value CNmin+α which has a certain tolerance with respect to the limiting oxygen concentration CNmin which does not have an adverse affect on the human body. When the oxygen concentration CNo is higher than the predetermined concentration CNth, the routine proceeds to a step S73, and the heater 21 is activated to heat the water in the water storage 12. When it is lower than the predetermined concentration CNth, the routine proceeds to the step S66 and the heater 21 is stopped. The reason for stopping the heater 21 when the oxygen concentration CNo is less than the predetermined concentration CNth is that, if the heater 21 were continually operated in a closed space, for example, an underground parking lot or indoor parking area, the oxygen concentration around the vehicle would fall, and possibly have an adverse affect on persons in the vicinity.

In a step S74, it is determined whether the present time t is prior to RST1+Δt (Δt: predetermined time), and when it is prior to RST1+Δt, the routine is terminated. When it is past this time, the routine proceeds to a step S75, and a restart estimation time correction mode, which corrects the restart estimation time and reviews the protection mode selection, is applied. The predetermined time Δt is set to an arbitrary time of zero or longer. The restart estimation time correction mode will be described later.

Figure 9:
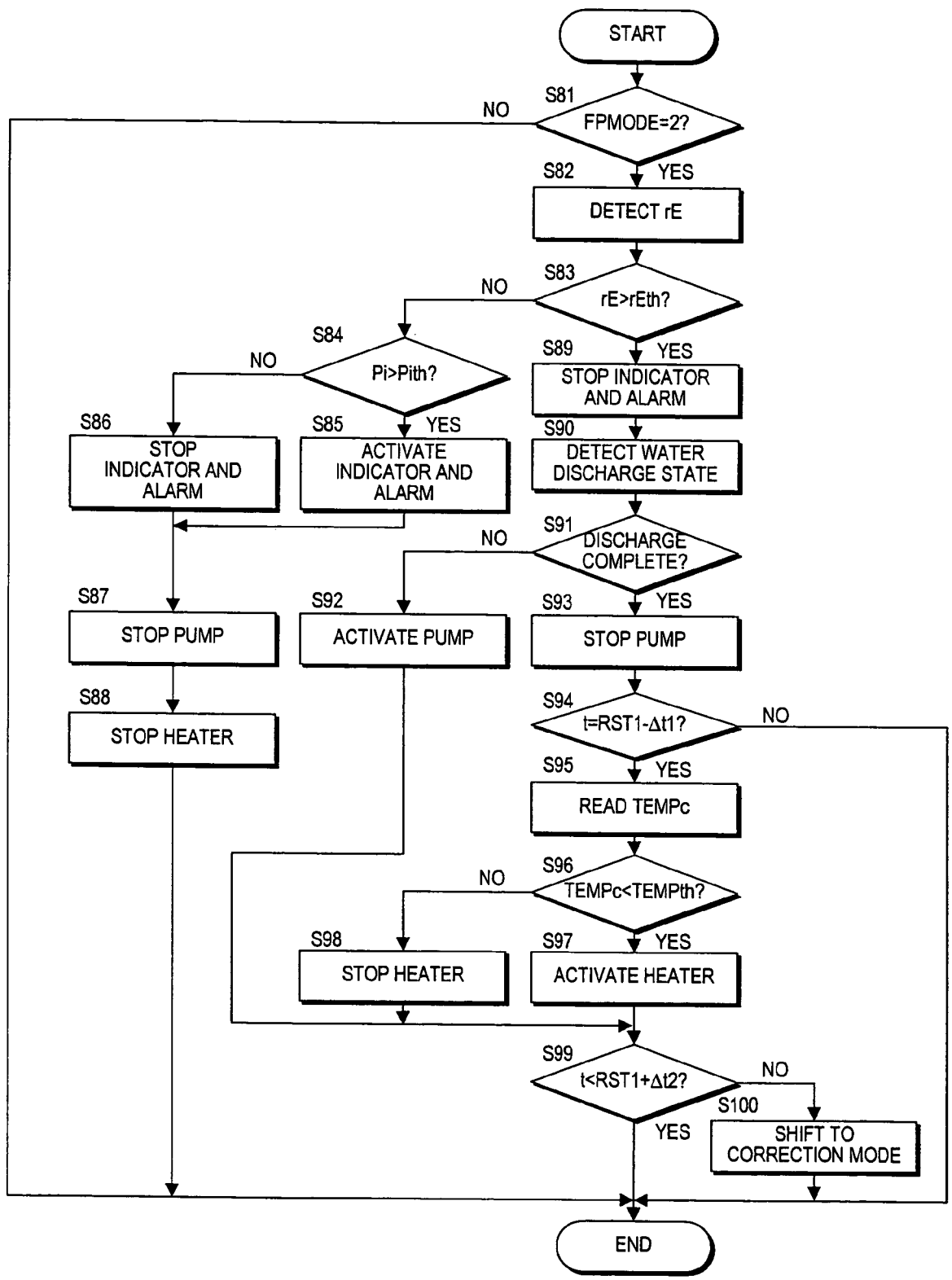
FIG. 9 is a flowchart showing a protection processing when the second protection mode is selected.

Next, the protection processing performed by the controller 20 when the second protection mode is selected in the step S10 will be described referring to FIG. 9.

First, in a step S81, it is determined whether the second protection mode has been selected based on the value of the flag FPMODE. When it is determined that the flag FPMODE is "2" and the second protection mode is selected, the routine proceeds to a step S82, otherwise this routine is terminated.

In the step S82, the remaining energy amount rE (remaining fuel amount, remaining battery amount) is detected. In a step S83, it is determined whether the remaining energy amount rE is less than the predetermined value rEth. The predetermined value rEth is set to the minimum energy amount required to restart the fuel cell stack 1 and then run the vehicle for a certain time after the fuel cell stack 1 is restarted. When it is less than the predetermined value rEth, the routine proceeds to a step S84 and it is determined whether the power amount Pi for the indicator 41 and alarm 42 is larger than the predetermined value Pith, otherwise the routine proceeds to a step S89.

When it is determined in the step S84 that the power amount Pi for the indicator 41 and alarm 42 is larger than the predetermined value Pith, the routine proceeds to a step S85, and the indicator 41 and alarm 42 are activated. Otherwise, the routine proceeds to a step S86, and the indicator 41 and alarm 42 are stopped. The routine then proceeds to a step S87, the pumps 10, 11 are stopped, the heater 21 is stopped in a step S88, and this routine is terminated.

When it is determined in the step S83 that the remaining energy amount rE is larger than the predetermined value rEth, the indicator 41 and alarm 42 are stopped in the step S89. In a step S90, a discharge state is detected. Here, to determine the discharge state, the water amount in the fuel cell stack 1 is detected by a water amount sensor 39.

In the step S91, when it is determined that the detected water amount in the fuel cell stack 1 is not zero and discharge of water is not complete, the routine proceeds to a step S92. In the step S92, the pumps 10, 11 are activated, and the water in the fuel cell stack 1 is discharged to the water storage tank 12. At this time, the pump 11 rotates in the reverse direction to discharge and recover water from the fuel cell stack 1 to the water storage tank 12. Conversely, when it is determined that the detected water amount is zero and discharge of water is complete, the routine proceeds to a step S93, and the pumps 10, 11 are stopped.

In a step S94, it is determined whether the present time t has reached to a predetermined time Δt1 prior to the restart estimation time RST1. When it is determined that this time has been reached, the routine proceeds to step S95 and the fuel cell temperature TEMPc is read. The predetermined time Δt1 here is set longer than the time required to thaw the ice in the water tank 12 by heating with the heater 21.

In a step S96, it is determined whether the fuel cell temperature TEMPc is lower than the predetermined temperature TEMPth. When it is lower than TEMPth, the routine proceeds to a step S97, and the heater 12 is activated to thaw the ice in the water tank 12. Otherwise, thawing is unnecessary, so the routine proceeds to a step S98, and the heater 21 is stopped. Thawing is started at a predetermined time Δt1 before the restart estimation time RST1 in order to complete thawing of the ice in the water tank 12 by the restart estimation time RST1, and enable immediate restart of the fuel cell stack 1.

In a step S99, it is determined whether the present time t is prior to RST1+Δt2 (Δt2: predetermined time), and when it is prior to RST1+Δt2, this routine is terminated. When it is past this time, the routine proceeds to a step S100, and there is a shift to the restart estimation time correction mode which corrects the restart time and reviews the protection mode selection. The predetermined time Δt2 is set to an arbitrary time of zero or longer.

Figure 10:
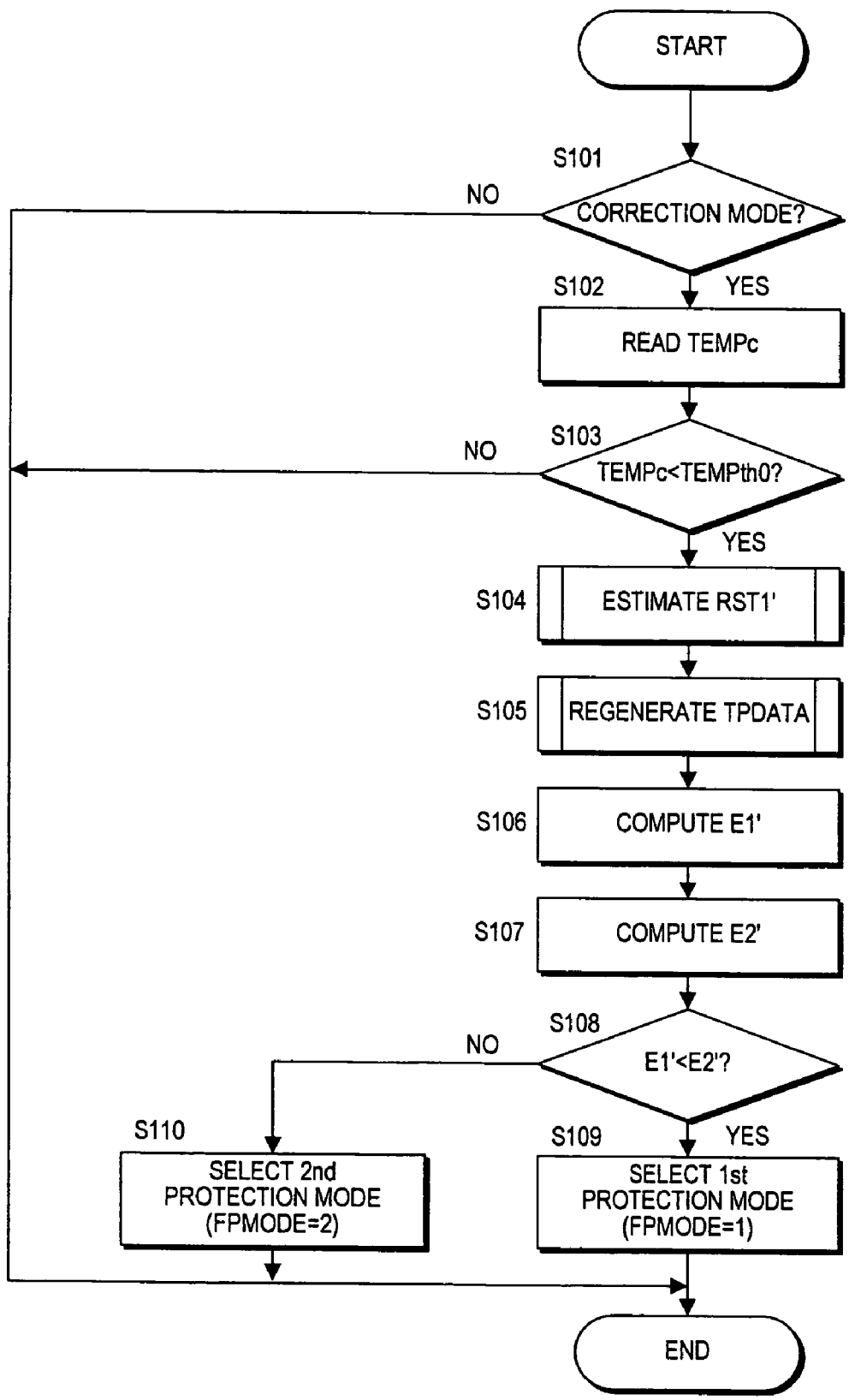
FIG. 10 is a flowchart showing a protection mode selection processing in a restart estimation time correction mode.

Next, the processing performed by the controller 20 when there is a shift to the restart estimation time correction mode (hereafter, correction mode) will be described referring to FIG. 10. In the correction mode, the controller 20 corrects the restart estimation time of the fuel cell stack 1, and reviews the protection mode selection based on the corrected restart estimation time.

First, in a step S101, it is determined whether the correction mode is being applied. When is determined that the correction mode is not applied, this routine is terminated, and when it is determined that the correction mode is applied, the routine proceeds to a step S102 and the fuel cell temperature TEMPc is read.

In a step S103, it is determined whether the fuel cell temperature TEMPc is lower than the predetermined temperature TEMPth0 (e.g., 5° C.). When it is lower than the predetermined temperature TEMPth0, the routine proceeds to a step S104, and the restart estimation time RST1 is corrected to estimate a corrected restart time RST1'. The corrected restart estimation time RST1' is estimated according to the flowchart shown in FIG. 11, which will be described later.

In a step S105, the outside air temperature shift is estimated up to the restart prediction time RST1' after correction, and the outside air temperature shift data TPDATA is regenerated. The regeneration of the outside air temperature shift data TPDATA is performed according to the flowchart shown in FIG. 7 already described, so its description will be omitted here.

In the steps S106, S107, the energy amounts E1', E2' required when the system was protected up to the corrected restart estimation time RST1' by selecting the first protection mode or second protection mode, are respectively computed. The method of computing the energy amounts E1', E2' is identical to that for the energy amounts E1, E2 in the steps S6, S7, so its description will be omitted.

In a step S108, the energy amount E1' required when the first protection mode is selected and the energy amount E2' when the second protection mode is selected, are compared. When the energy amount E1' is less than the energy amount E2', the routine proceeds to a step S109, the first protection mode is selected, and the flag FPMODE is set to "1" showing that the first protection mode was selected. Conversely, when the energy amount E1' is larger than the energy amount E2', the routine proceeds to a step S10, the second protection mode is selected, and the flag FPMODE is set to "2" showing that the second protection mode was selected.

Figure 11:
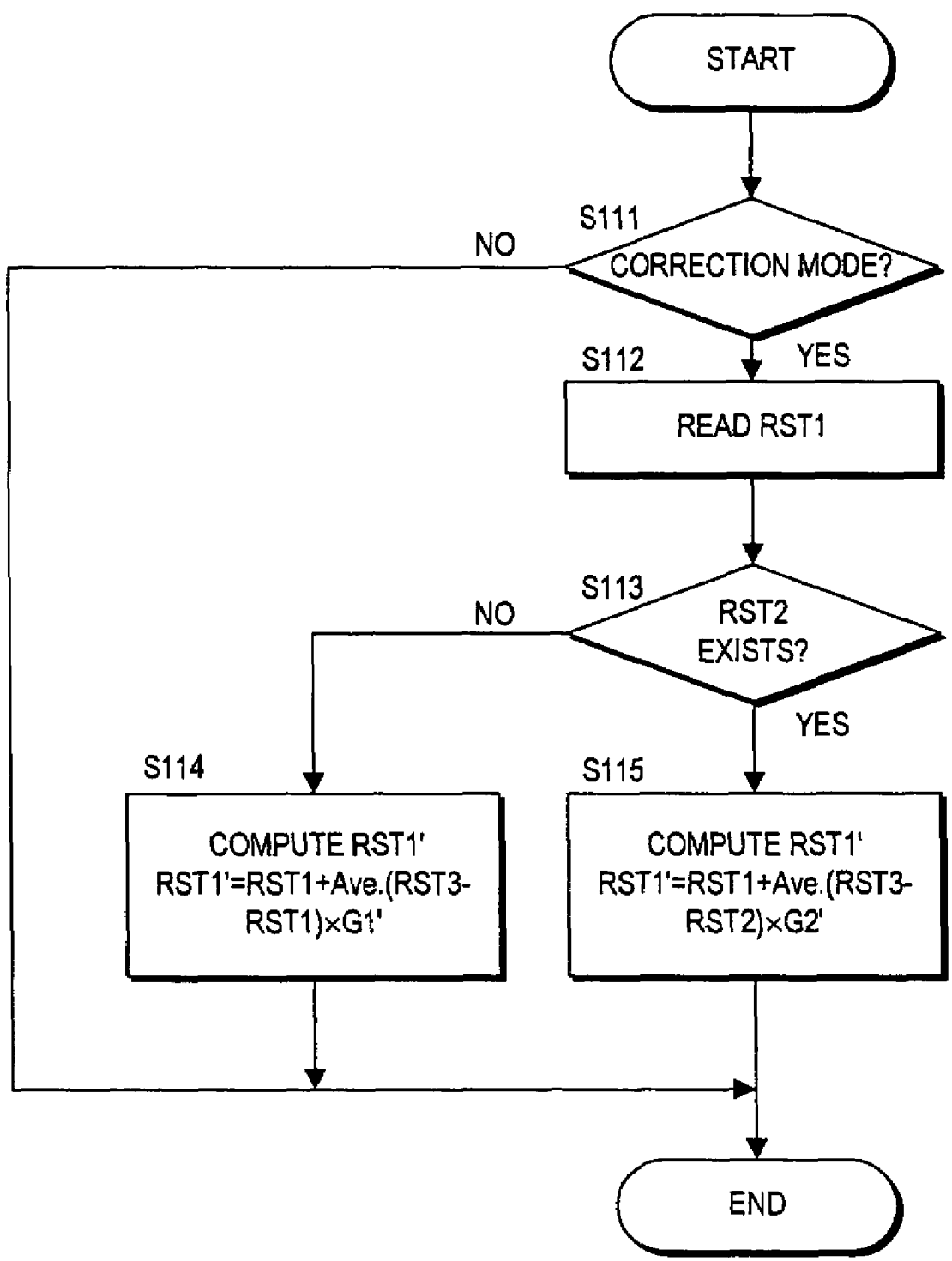
FIG. 11 is a flowchart showing a processing for computing a corrected restart estimation time.

Next, the method of computing the corrected restart time will be described referring to FIG. 11. This computation corresponds to the processing in the step S104 of FIG. 10.

First, in a step S111, it is determined whether the correction mode is being applied. When the correction mode is not applied, this routine is terminated, and when the correction mode is applied, the routine proceeds to a step S112.

In the step S112, the restart estimation time RST1 prior to correction is read. In a step S113, it is determined whether the external input time RST2 exists. When the external input time RST2 does not exist, the routine proceeds to a step S114, and the corrected restart estimation time RST1' is computed from the following equation:

$$RST1' = RST1 + Ave.(RST3 - RST1) \times G1'$$

where, G1'=gain.

Figure 6:
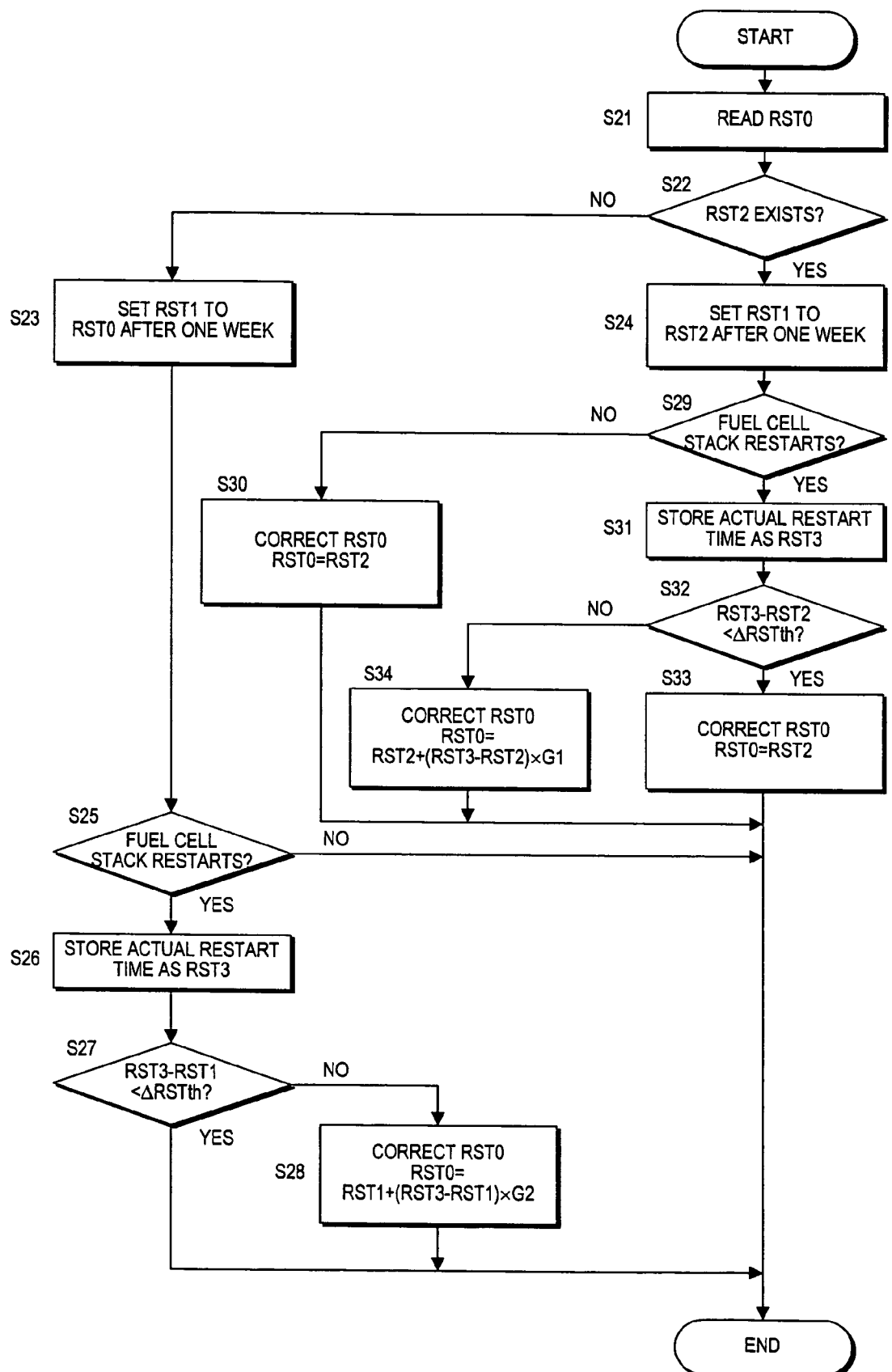
FIG. 6 is a flowchart showing a restart time estimation processing.

Ave.(RST3−RST1) is the cumulative value obtained by weighted average processing each time (RST3−RST1) is computed in the step S27 of FIG. 6. On the other hand, when the external input time RST2 exists, the routine proceeds to a step S115, and the corrected restart estimation time RST1' is computed from the following equation:

$$RST1' = RST1 + Ave.(RST3 - RST2) \times G2'$$

where, G2=gain.

Ave.(RST3−RST2) is the cumulative value obtained by weighted average processing each time (RST3−RST2) is computed in the step S32 of FIG. 6.

In the above embodiments, the coolant is water containing antifreeze, but pure water may also be used as the coolant, in which case a device equivalent to the heater 21 of the water storage tank 12 may be installed in the coolant tank 6, and an identical control to that of the above embodiments performed.

The entire contents of Japanese Patent Application P2002-88075 (filed Mar. 27, 2002) are incorporated herein by reference.

Although the invention has been described above by reference to a certain embodiment of the invention, the invention is not limited to the embodiment described above. Modifications and variations of the embodiment described above will occur to those skilled in the art, in the light of the above teachings. The scope of the invention is defined with reference to the following claims.

INDUSTRIAL FIELD OF APPLICATION

This invention may be applied to fuel cell systems, and may of course be applied to fuel cell systems other than those used in vehicles. This invention can suppress the energy amount required to protect the system from freezing of water to the absolute minimum.

The invention claimed is:

1. A fuel cell system, comprising:
   a fuel cell which generates power by supplying an oxidizing agent and a hydrogen-containing gas to an electrolyte membrane,
   a water supply device which supplies water to the fuel cell, and
   a controller functioning to:
   estimate a restart time when the fuel cell is restarted,
   estimate a shift of an outside air temperature,
   compute a first energy amount required when the system is protected by a first protection mode which prevents freezing of water in the system by heating water supplied to the fuel cell when the fuel cell has stopped, and a second energy amount required when the system is protected by a second protection mode which prevents freezing of water in the system by discharging water from the fuel cell when the fuel cell has stopped, respectively based on the estimated restart time and outside air temperature shift,
   select the first protection mode when the first energy amount is less than the second energy amount, and select the second protection mode when the first energy amount is larger than the second energy amount as a protection mode used when the fuel cell has stopped,
   protect the system with the selected protection mode,
   correct the estimated restart time when the fuel cell is not restarted although a predetermined time after the estimated restart time has elapsed, and
   perform the protection mode selection again based on the corrected restart time.

2. The fuel cell system as defined in claim 1, further comprising:
   a sensor which detects day and time, and wherein
   the controller further functions to estimate the shift of outside air temperature based on the detected day and time.

3. The fuel cell system as defined in claim 1, further comprising:
   a sensor which detects a position of the system, and wherein the controller further functions to estimate the shift of outside air temperature based on the detected system position.

4. The fuel cell system as defined in claim 1, further comprising:
a sensor which detects an illumination surrounding the system, and wherein:
the controller further functions to estimate the shift of outside air temperature based on the detected illumination.

5. The fuel cell system as defined in claim 1, further comprising:
a device into which climatic information is input, and wherein:
the controller further functions to estimate the shift of outside air temperature based on the input climatic information.

6. The fuel cell system as defined in claim 1, further comprising:
a sensor which detects the outside air temperature, and wherein:
the controller further functions to correct the estimated outside air temperature shift based on the difference between the outside air temperature obtained from the estimated outside air temperature shift and the detected outside air temperature.

7. The fuel cell system as defined in claim 1, wherein:
the controller further functions to apply a difference between an actual restart time when the fuel cell actually restarts and the estimated restart time, to the estimation of restart time on the next occasion.

8. The fuel cell system as defined in claim 1, further comprising:
a device into which a driver inputs the restart time, and wherein:
the controller further functions, when there is an input restart time, to estimate that the fuel cell restarts at the input restart time.

9. The fuel cell system as defined in claim 1, wherein:
the controller further functions to correct the estimated restart time based on a difference between the estimated restart time and an actual restart time.

10. The fuel cell system as defined in claim 1, further comprising:
a sensor which detects a remaining energy amount in the system, and wherein:
the controller further functions to stop protection of the fuel cell in the first protection mode when the detected remaining energy amount in the system is less than a predetermined value.

11. The fuel cell system as defined in claim 1, further comprising:
a sensor which detects an oxygen concentration outside the system, and wherein:
the controller further functions to stop protection in the first protection mode when the detected oxygen concentration outside the system is lower than a predetermined value.

12. The fuel cell system as defined in claim 1, further comprising:
a device which issues an alarm when the remaining energy amount in the system is less than a predetermined value.

13. The fuel cell system as defined in claim 1, wherein:
the controller further functions to start thawing ice which has frozen outside the fuel cell from a predetermined time prior to the estimated restart time when the system is protected in the second protection mode.

14. The fuel cell system as defined in claim 1, further comprising:
a switch which starts the fuel cell, and wherein:
the controller further functions to stop protecting the system and start the fuel cell when the switch is operated when the system is protected by the first or second protection mode.

15. A method of protecting a fuel cell system having a fuel cell which generates power by supplying an oxidizing agent and a hydrogen-containing gas to an electrolyte membrane, and a water supply device which supplies water to the fuel cell, the method comprising:
estimating a restart time when the fuel cell is restarted,
estimating a shift of an outside air temperature,
computing a first energy amount required when the system is protected by a first protection mode which prevents freezing of water in the system by heating water supplied to the fuel cell when the fuel cell has stopped, and a second energy amount required when the system is protected by a second protection mode which prevents freezing of water in the system by discharging water from the fuel cell when the fuel cell has stopped, respectively based on the estimated restart time and outside air temperature shift,
selecting the first protection mode when the first energy amount is less than the second energy amount, and selecting the second protection mode when the first energy amount is larger than the second energy amount as a protection mode used when the fuel cell has stopped,
protecting the system with the selected protection mode,
correcting the estimated restart time when the fuel cell is not restarted although a predetermined time after the estimated restart time has elapsed, and
performing the protection mode selection again based on the corrected restart time.

16. A fuel cell system, comprising:
a fuel cell which generates power by supplying an oxidizing agent and a hydrogen-containing gas to an electrolyte membrane,
a water supply device which supplies water to the fuel cell,
means for estimating a restart time when the fuel cell is restarted,
means for estimating a shift of an outside air temperature,
means for computing a first energy amount required when the system is protected by a first protection mode which prevents freezing of water in the system by heating water supplied to the fuel cell when the fuel cell has stopped, and a second energy amount required when the system is protected by a second protection mode which prevents freezing of water in the system by discharging water from the fuel cell when the fuel cell has stopped, respectively based on the estimated restart time and outside air temperature shift,
means for selecting the first protection mode when the first energy amount is less than the second energy amount, and select the second protection mode when the first energy amount is larger than the second energy amount as a protection mode used when the fuel cell has stopped,
means for protecting the system with the selected protection mode,
means for correcting the estimated restart time when the fuel cell is not restarted although a predetermined time after the estimated restart time has elapsed, and
means for performing the protection mode selection again bases on the corrected restart time.

* * * * *